United States Patent [19]

Fulford et al.

[11] Patent Number: 4,994,244
[45] Date of Patent: Feb. 19, 1991

[54] PROCESS FOR PRODUCING ALUMINA FROM BAUXITE

[75] Inventors: George D. Fulford, Kingston, Canada; David R. Chinloy, Ewarton, Jamaica; Pierre G. Cousineau, Chicoutimi; Stephen Ostap, Bath, both of Canada

[73] Assignee: Alcan International Limited, Montreal, Canada

[21] Appl. No.: 462,777

[22] Filed: Jan. 10, 1990

[30] Foreign Application Priority Data

Jan. 31, 1989 [CA] Canada .................................. 589,667

[51] Int. Cl.⁵ ............................................... C01F 7/06
[52] U.S. Cl. .................................................... 423/121
[58] Field of Search .......................................... 423/121

[56] References Cited

U.S. PATENT DOCUMENTS

4,446,117  5/1984  McDaniel ........................... 423/121
4,483,830 11/1984  Cresswell ........................... 423/121

Primary Examiner—Peter D. Rosenberg
Attorney, Agent, or Firm—Cooper & Dunham

[57] ABSTRACT

A process for producing alumina from bauxite by the Bayer process. Bauxite slurry is pressure digested in caustic soda solution to dissolve aluminum hydroxides in the bauxite as sodium aluminate while leaving most of the remaining constituents of the bauxite in solid form as red mud. The red mud is separated from the digested slurry to obtain a caustic-aluminate pregnant liquor, alumina hydrate is precipitated from the pregnant liquor and the alumina hydrate is calcined to obtain the alumina. The separation of the red mud from the digested slurry is carried out at a temperature above the boiling atmospheric temperature of the liquor phase of the slurry.

14 Claims, 5 Drawing Sheets

PROCESS FOR PRODUCING ALUMINA FROM BAUXITE

BACKGROUND OF THE INVENTION

This invention relates to a process for producing alumina from bauxite and, more particularly, to a Bayer process with an improved red mud separation stage.

In the Bayer process for producing alumina from bauxite, the bauxite containing aluminum trihydroxides or aluminum oxide-hydroxides is contacted with solutions containing caustic soda to dissolve the aluminum hydroxides as sodium aluminate while leaving most of the remaining constituents of the bauxite essentially unattacked in solid form. A part or all of the silica content of the bauxite may also dissolve in the caustic soda solution to form a soluble sodium silicate. This reacts relatively slowly with the sodium aluminate in solution to form complex hydrated sodium aluminum silicates, known collectively as "desilication product". These desilication products are of low solubility in the resulting sodium aluminate-caustic soda solutions and largely precipitate out of solution thereby removing much of the undesirable silica from the solution phase. However, there is the substantial cost of an appreciable loss of chemically-bound caustic soda and alumina in the desilication product.

After the digestion step for dissolving the aluminum hydroxide from the bauxite, the undissolved part of the bauxite, together with any desilication product that has precipitated at this point, which are known as "red mud", are separated from the solution, usually by filtration or sedimentation or both. The red mud is then disposed of, usually after being washed to recover the soluble valuables from the entrained caustic-aluminate solution. The clear caustic-aluminate solution after precipitation of the red mud, commonly known as "pregnant liquor", is subsequently cooled, diluted, seeded with aluminum trihyroxide crystals (gibbsite) and agitated for a period of time to precipitate a significant fraction of the dissolved alumina as gibbsite. This precipitate is then separated from the resulting spent liquor, which typically still contains in the order of half of the original dissolved alumina. A part of the separated gibbsite may be recirculated as seed material to the aluminum precipitation operation, while the remainder is washed to recover the soluble valuables from the entrained liquor, and is then suitably calcined to for alumina product of the Bayer process. The spent liquor may be re-concentrated, impurities removed and new caustic soda added as caustic feed to the digestion step.

The solubility characteristics of the aluminum hydroxides and caustic soda solutions require that the digestion step be carried out at high caustic soda concentration and high temperature in the circuit, and that the gibbsite precipitation step be carried out at low caustic concentration and low temperature in circuit. The levels of caustic soda concentration and temperature are typically determined by the type of aluminum hydroxide present in the bauxite, process economics and equipment constraints.

Key parts of the Bayer process consist of the digestion step and the mud separation step in which the aluminum hydroxide minerals of the bauxite are brought into solution in caustic-aluminate solution as soluble sodium aluminate and the remaining insoluble residue (red mud) is separated from the resulting pregnant solution, leaving a clear caustic soda-sodium aluminate solution from which purified gibbsite can subsequently be crystallized. Since the nature of the solubility of the aluminum hydroxide minerals in caustic soda solutions usually requires that the digestion step be carried out at an elevated temperature in order to achieve higher solubilities of the alumina and hence reasonable liquor productivity (weight of alumina produced per volume of liquor circulated), while the precipitation step needs to be carried out at much lower temperatures to minimize the alumina solubility at this point in the process, it can be seen that equipment must be provided for heating the incoming liquor and bauxite to the temperature required for digestion and for cooling the liquor and red mud solids after digestion.

Most current Bayer plants make use of a digestion and mud separation module consisting basically of the equipment required to carry out the following sequence of operations:

(1) Preheating the incoming spent caustic aluminate liquor and bauxite passing to the digesters, using as much as possible recuperated heat followed by high-temperature heat from an external source;

(2) Carrying out the digestion while usually providing a residence time sufficient to permit removal of most of the silica dissolved from clay or quartz minerals in the bauxite by precipitation of a complex sodium aluminosilicate desilication product;

(3) Cooling the digested slurry by flashing the slurry at one or more decreasing pressures down to about atmospheric boiling temperature and using the flashed steam recovered for preheating purposes;

(4) At or below atmospheric boiling temperature, separating the red mud residue from the pregnant aluminate liquor, typically by filtration, or by flocculation, sedimentation and polish-filtration of the clear solution.

SUMMARY OF THE INVENTION

According to the present invention, it has now been discovered that it is possible to modify a typical Bayer process such that the separation of the red mud from the digested slurry may be carried out at a temperature above the atmospheric boiling temperature of the liquor phase of the slurry. It has been found to be particularly advantageous to carry out the separation at a temperature sufficiently high that the liquor phase of the slurry is below saturation or not significantly supersaturated with respect to soluble alumina constituents, e.g. gibbsite, during the red mud separation operation.

Thus, the present invention in its broadest aspect relates to a Bayer process for producing alumina from bauxite which comprises digesting bauxite slurries in caustic soda solution to dissolve aluminum hydroxides in the bauxite as sodium aluminate while leaving most of the remaining constituents of the bauxite in solid form as red mud, separating the red mud from the digested slurry to obtain a caustic-aluminate pregnant liquor, precipitating alumina hydrate from the pregnant liquor and calcining this to alumina. According to the novel feature, the step of separating the red mud from the digested slurry is carried out at a temperature above the atmospheric boiling temperature of the liquor phase of the slurry and preferably at a temperature sufficiently high that the liquor phase of the slurry is below saturation or not significantly supersaturated with respect to soluble alumina constituents during the mud separation operation.

The digestion is typically carried out by digesting slurries of bauxite in fresh or recycled caustic soda or caustic-aluminate liquors at temperatures above the atmospheric boiling temperature of the liquor. A gibbsitic bauxite is typically digested at a temperature in the range of 120°–150° C., while a boehmitic bauxite is typically digested at a temperature in the range of 220°–260° C. The caustic liquor and bauxite slurry may be preheated together or separately first recuperatively by heat exchange and/or by live steam or a molten-salt heat transfer medium, etc.

The separation is preferably carried out by settling in the presence of a synthetic flocculant, filtering, or centrifuging. Since the temperature used is above atmospheric boiling temperature, the separation must be carried out in a pressure system. The pressures involved may be typically up to 6 atmospheres. If the red mud is separated by sedimentation under pressure rather than by filtration under pressure, final traces of red mud are preferably removed from the pregnant liquor stream by means of a polishing-filtration operation. This can be performed in the conventional manner using leaf filters or sand filters or the like after the separated pregnant liquor has been cooled by flashing or surface heat exchange to the atmospheric boiling temperature or below. Alternatively, it may be carried out by pressure filtration also at the temperature of the primary red mud separation step to take advantage of the lower liquor viscosity and greater liquor stability at the higher temperatures. The clarified pregnant liquor phase is then cooled by flashing or surface heat exchange to the temperature required in the subsequent operations of the process.

The red mud solids which are removed in the primary red mud solid separation step and the liquors entrained with these solids are cooled to or below the atmospheric boiling temperature for passage to the mud washing circuit either by quenching this concentrated solids-containing stream or by heat exchange.

The liquor phase of the digested slurry has a quite high soluble alumina content which approaches but remains somewhat below saturation. However, any appreciable decrease in the temperature of the liquor causes supersaturation with respect to at least one of the alumina constituents. The most critical of these is gibbsite which precipitates quickly when its saturation point is reached. Thus, the separation is preferably always be carried out at or only slightly below the gibbsite digestion temperature. When both gibbsite and boehmite are present, the separation preferably may be carried out in the vicinity of the boehmite digestion temperature, but separating temperatures may, if desired, be lowered to a point at or only slightly below the gibbsite digestion temperature without substantial loss of alumina constituents. Since the rate of boehmite precipitation is relatively slow even at the lower gibbsite digestion temperature, the alumina losses due to boehmite reversion are minimal in view of the fact that the pressure, high temperature mud separation according to this invention is achieved very rapidly.

There are important advantages to the process of the present invention as compared to the usual Bayer processes. For instance, it has been usual procedure to subject the digested slurry to flash cooling before red mud separation. In the case of certain red muds, e.g. from Jamaican bauxites, this flash cooling leads to a considerable deterioration in the separability of the red mud from the liquor. The process of this invention not only avoids that difficulty by having little or no flash cooling of the digested slurry prior to separation, but also takes advantage of reduced specific gravity and/or viscosity and increased stability of the liquor at higher temperatures. Thus, the present invention provides an improved separation with the separation occurring quickly with excellent liquor clarity. This rapid separation means a short residence time in the separator and therefore a decreased loss of alumina due to reversion, even when the liquor is somewhat supersaturated with respect to boehmite.

Secondary benefits emanate from the above advantages. These include the possibility of using smaller mud separating and washing equipment, improved washing of the mud for a given input of wash water, leading to reduced soluble caustic and alumina losses, and to the need for less wash water for washing the red mud before disposal, which translates into a reduced evaporation load in the plant and hence further energy savings.

A further benefit from this invention relates to desilication. Thus, it has been customary with conventional digestion/mud separation systems to carry out a significant part of the desilication operation inside the pressure digester. Since the desilication reaction is relatively slow, this typically controls the residence time required in the expensive pressure digester equipment. With the process of this invention, it is possible to use a reduced residence time in digestion limited to the time actually required for the extraction of the aluminum hydroxide minerals from the bauxite. A seeded, controlled postdesilication is then carried out after the pressure red mud separation step, either at the temperature of the pressure red mud separation or after cooling the pregnant liquor. The rate of the desilication reaction can be forced by the addition of recirculated desilication product seed.

Preferred embodiments of this invention will now be described in association with the formal drawings in which.

Figure 1:
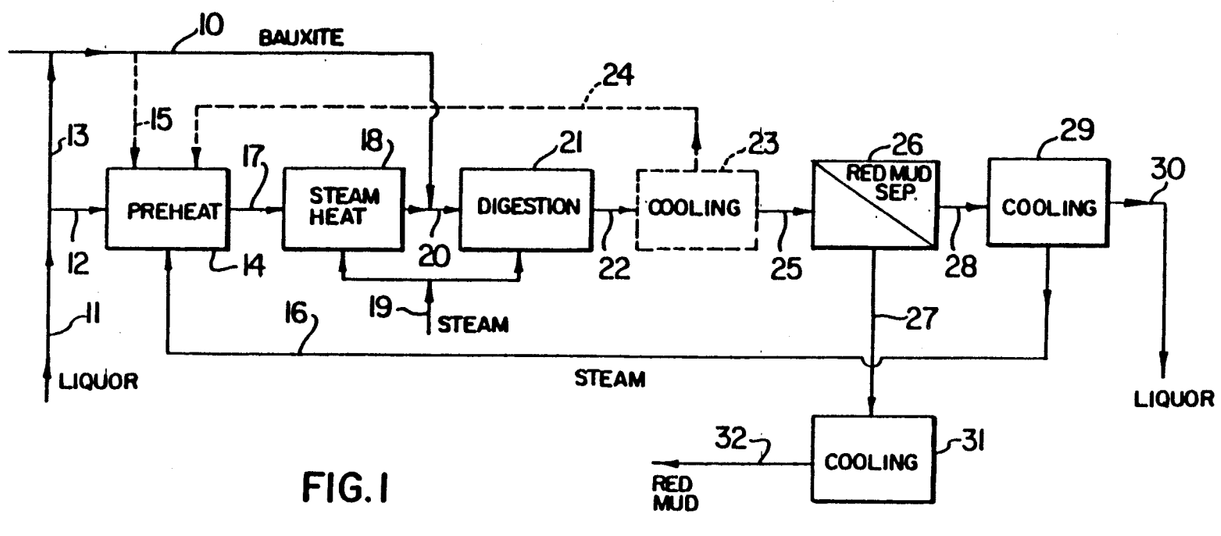
FIG. 1 is a flow sheet of a basic Bayer process according to the present invention.

As shown in the flow sheet of FIG. 1, bauxite is fed into the system through inlet line 10. This may typically be a gibbsitic bauxite or a boehmitic or a mixed bauxite. A recirculated spent liquor is fed to the system through line 11 with part being fed directly through line 12 into preheater 14 and part being fed through line 13 to the bauxite line 10 to form a slurry therewith. If desired, some or all of this bauxite slurry in line 10 may be fed via line 15 directly to the preheater 14.

Heat is supplied to the recuperative preheater 14 primarily by flash steam 16 from a downstream portion of the process. Preheated liquor emerging from preheater 14 via line 17 enters a second preheating stage 18 where further heating is conducted by live steam 19. Alternatively, a molten salt or similar heat transfer medium may be employed in a surface heater. The material discharging from preheater 18 in line 20 is mixed with the bauxite slurry from line 10 and this slurry mixture is fed into a digester 21. Further live steam 19 may be supplied as required to digester 21 to achieve the necessary digestion temperature.

A gibbsitic bauxite is typically digested at a temperature in the range of 120°-150° C., while a boehmitic bauxite is typically digested at a temperature in the range 220°-260° C.

The digested slurry is discharged through line 22 and if any partial cooling is required, this may be done in stagewise liquid flash cooling system 23 with any flash steam formed being recovered and recycled to recuperative preheater 14.

The slurry discharging from either cooler 23 or digester 21 is fed to a red mud separator 26, e.g. a pressure filter or a pressure decanter plus polish filter combination where separation is carried out either at digestion temperature or at a lower temperature still exceeding the atmospheric boiling temperature of the liquor.

The separated red mud is drawn off through discharge 27, is cooled or quenched in apparatus 31 and thickened red mud 32 is fed to washing.

The pregnant liquor from separator 26 is fed via line 28 to a stagewise liquid flash cooling system 29. The steam flashed off is recycled via line 16 to preheater 14, while the cooled pregnant liquor is withdrawn through line 30 for subsequent processing.

Figure 2:
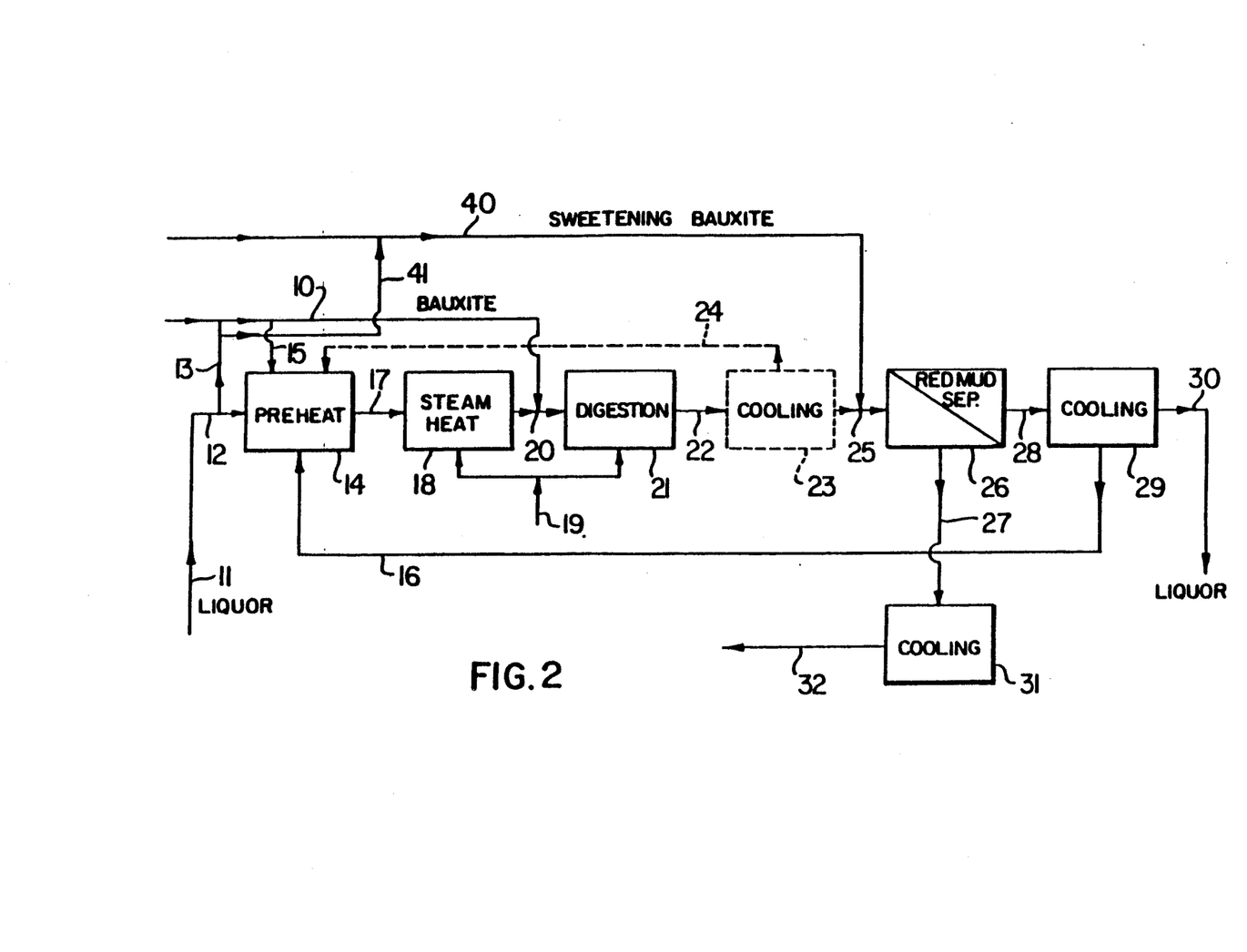
FIG. 2 is a modification of the flow sheet of FIG. 1 and including a sweetening bauxite steam.

FIG. 2 shows a modification to the flow sheet of FIG. 1 in which a sweetening bauxite stream 40 is added and connects to connector line 25 upstream of red mud separator 26. A connector line 41 connects liquor line 13 to sweetening bauxite line 40.

This modification is of particular interest when a mixed boehmitic/gibbsitic bauxite forms the main plant feed 10, with the sweetening bauxite being mainly gibbsitic bauxite. In this situation, the gibbsite and boehmite from the main stream 10 can be extracted under less extreme conditions than are usually required for boehmite extraction by reducing the alumina concentration in the liquor at the end of the digestion. Then, the alumina concentration is raised to an economically viable level by extracting more soluble gibbsite from the second portion of bauxite. However, should the second bauxite contain boehmite as well as gibbsite, only the gibbsitic portion is extracted.

Figure 3:
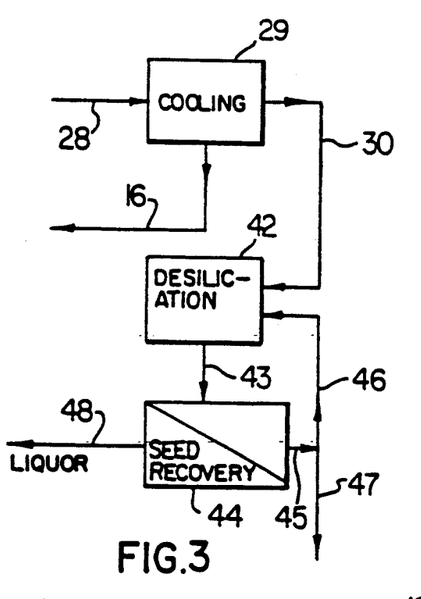
FIG. 3 is a flow sheet of a modified pregnant liquor treatment.

FIG. 3 shows a modification to the flow sheet which makes it possible to use a reduced residence time in digestion limited to the time actually required for the extraction of aluminum hydroxide minerals from the bauxite. This is accomplished by connecting the pregnant liquor line 30 to a seeded, controlled post-desilication unit 42, with the desilication being carried out after cooling the pregnant liquor to just below atmospheric boiling temperature. The product from the desilication unit 42 is discharged through line 43 into a separator 44 where the solids are separated from the pregnant liquor. The solid desilication product is drawn off through line 45 and can be discharged through line 47 or recycled as seed as required to desilication unit 42 via line 46. Clarified pregnant liquor is drawn off via line 48.

Figure 4:
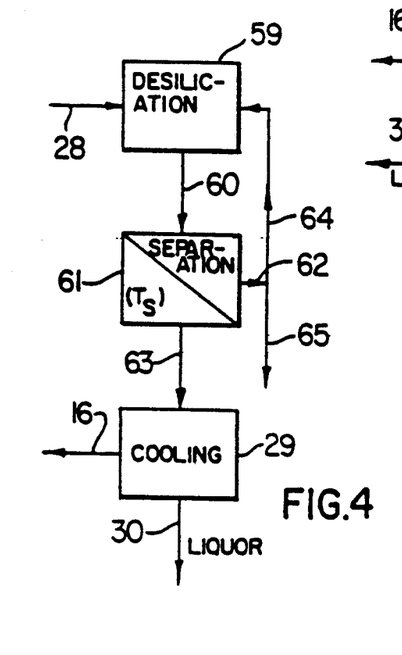
FIG. 4 is a flow sheet of a further modified pregnant liquor treatment.

FIG. 4 shows a variant of the basic flow sheet by having a reduced residence time in digestion limited to the time actually required for the extraction of the aluminum hydroxide minerals from the bauxite followed by a pressurized, seeded, controlled post-desilication 59 carried out on the pregnant liquor stream 28 immediately following the red mud separation 26. The post-desilication is carried out at essentially the same temperature as the red mud separation 26 which is greater than the atmospheric boiling temperature of the liquor and preferably is at least sufficiently high to cause the liquor to be not supersaturated with respect to gibbsite. Following the post-desilication operation 59, the resultant dilute liquor/desilication product slurry 60 is separated in separator 61 with the liquor phase 63 being further cooled by flashing or surface heat exchange in cooler 29 and passed via line 30 to subsequent process steps. Flash steam is collected via line 16 and passed back to the preheater stage 14.

Desilication product is drawn off via line 62 with as much as necessary of the product being recirculated as seed to the desilication operation 59 via line 64 and the surplus being disposed of via line 65 after being cooled and washed.

Figure 5:
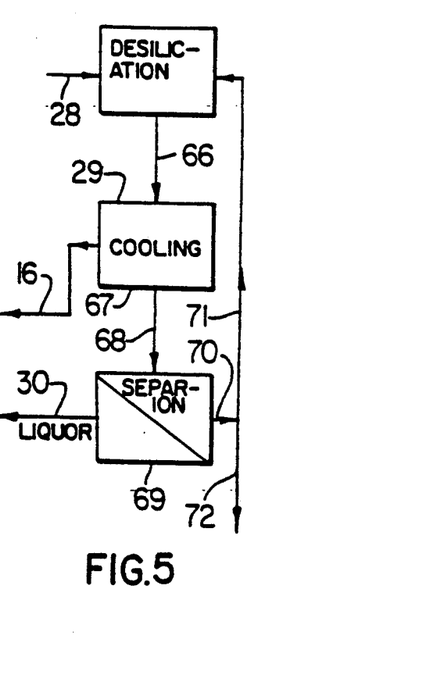
FIG. 5 is a flow sheet of yet another modified pregnant liquor treatment.

In the variant of FIG. 5 the pregnant liquor 28 stream immediately following red mud separation is again subjected to a pressurized, seeded, controlled desilication 59 to produce a slurry stream 66 of pregnant liquor and desilication product. This material is cooled via cooler 67 from the temperature of the red mud separation and post-desilication operations to about the atmospheric boiling temperature or below and this product stream 68 is subjected to separation in separator 69 with clarified pregnant liquor being drawn off via line 30 and the desilication product being drawn off via line 70 with a portion thereof being recycled as seed via line 71 and the remainder being withdrawn via line 72 as surplus and discharged after washing.

Figure 6:
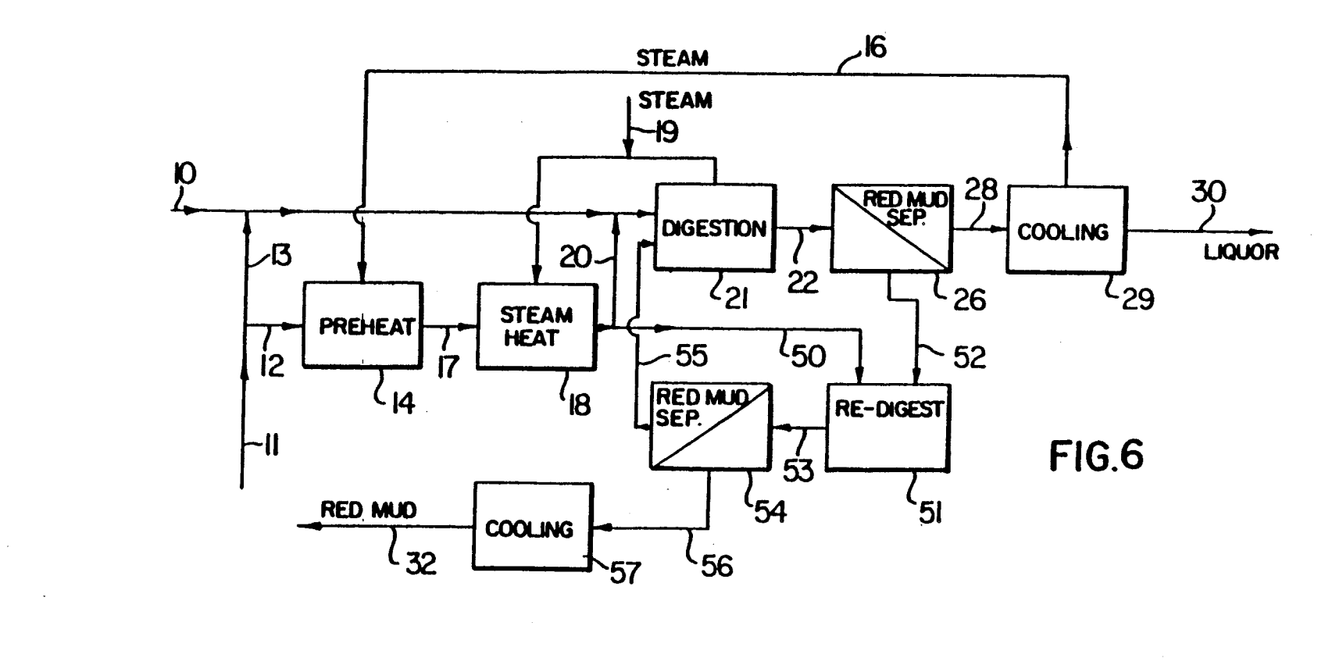
FIG. 6 is a flow sheet of a countercurrent double digestion.

Yet another variant to the flow sheet is shown in FIG. 6 in which a countercurrent double digestion is provided. Here the bauxite is digested in digester 21 under typical gibbsitic digestion conditions and is desilicated in the digester 21 with a moderate overcharge of bauxite relative to liquor to achieve a dissolved alumina concentration essentially equal to the gibbsite solubility. The red mud in this case is separated directly after digestion in separator 26 at digestion temperature or after some partial cooling at an intermediate temperature. When the first digested mud is separated at the digestion temperature, this red mud is transferred via line 52 to a second digester 51 for stripping the residual gibbsite at low alumina concentration in the liquor without further heating. Spent liquor is fed to digester 51 via line 50 and the product from the digester is drawn off through line 53 to red mud separator 54 which also operates at the digestion temperature or after some partial cooling at an intermediate temperature, the liquor of intermediate ratio withdrawn from separator 54 is recycled directly via line 55 to first digester 21 without need for further heating. The red mud is drawn off via line 56 and is subjected to cooling in cooler 57, and is then washed.

Figure 7:
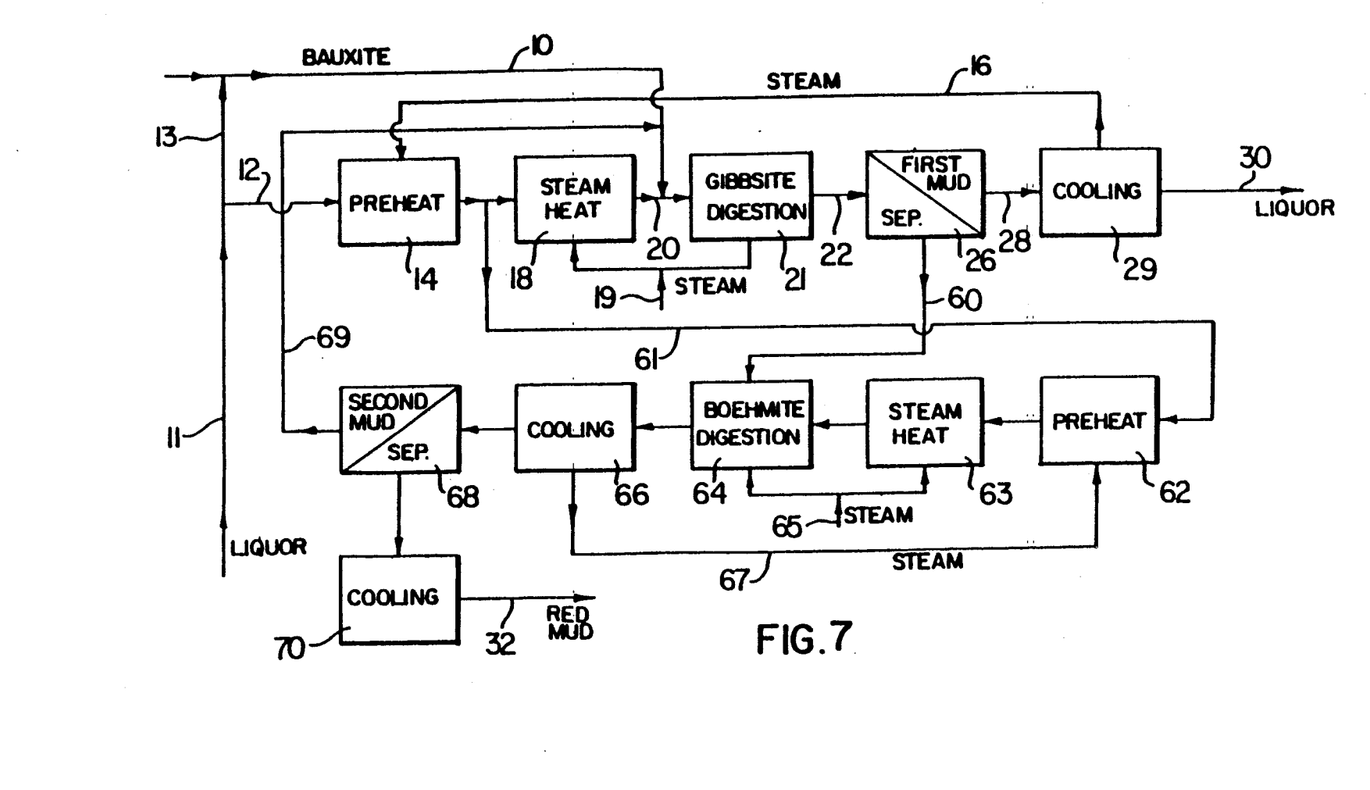
FIG. 7 is a flow sheet of a further counterurrent double digestion.

FIG. 7 shows a further variant to the flow sheet in which a countercurrent double digestion is carried out on a mixed bauxite feedstock containing both gibbsite and boehmite. In this procedure the first stage of the process is similar to the procedure of FIG. 1 with the liquor being preheated in recuperative preheater 14 and steam heater 18, and contacted with the mixed bauxite in gibbsite digester 21 at gibbsite digestion temperatures. The slurry from the digestion 21 is then separated in pressure separator 26 with the recovered liquor going to cooling 29 and the red mud being drawn off through line 60 to a second digestion stage. The liquor 30 obtained in this procedure is a very high ratio pregnant liquor which can be used for subsequent steps.

In the second digestion stage, the boehmite portion of the bauxite is subjected to digestion at less than usual boehmite digestion temperatures as a result of carrying out the digestion in liquor of reducced alumina concentration. Thus, the red mud from separator 26 is fed via line 60 into the boehmite digestion 64 where it is contacted with preheated liquor from line 61. This preheated liquor travels through recuperative preheater 62 and steam heater 63 where it is heated by steam 65 in order to reach the modified (intermediate) boehmite digestion temperatures. The low to moderate ratio slurry obtained from the boehmite digestion is cooled in flash cooler 66 with the recovered steam from cooler 66 being recycled via line 67 to preheater 62. The cooled slurry enters the second mud separator 68 where the red mud is separated from the liquor, with the liquor being recycled via 69 and the red mud being collected and cooled in the cooler 70 and then washed.

This two-stage digestion has the advantage that all of the liquor passing to both digestion operations is heated to the temperature of the gibbsite digester. Only the liquor passing to the second digester needs to be heated to the higher boehmite digestion temperature and, after the second digestion the liquor is cooled only to the gibbsite digestion temperature. This represents a significant energy saving and also reduces the number, size and cost of the equipment required.

Further preferred features of this invention are shown in the following example.

EXAMPLE

A comparative study of the process of this invention with a traditional alumina process was carried out by conducting full scale tests in a commercial plant. These tests were conducted on a Jamaican bauxite containing approximately 43% gibbsitic alumina, 1.5% boehmitic alumina, 1.5% reactive $SiO_2$ and about 18-19% $Fe_2O_3$. The bauxite was digested in caustic soda solution containing 195 g/l as a equivalent $Na_2CO_3$. Digestion was carried out at 135° C. for approximately 40 minutes.

Slurries obtained from this digestion were separated using (a) conventional separators and (b) the separator system of the present invention.

(A) Convention Procedure

For this procedure, the slurry from the digestion was subjected to stagewise flash cooling whereby the temperature was lowered to approximately 103° C. Approximately 90 g. of synthetic flocculant per metric ton of red mud solids was added to the digested, cooled slurry which was then settled in three conventional open thickeners each of 31 meters diameter operating in parallel. The synthetic flocculant was a known high molecular weight synthetic flucculant for red mud which was of the acrylate-acrylamide copolymer type.

(B) Inventive Separation

An equal volume of digestion slurry had added thereto approximately 160 g. of the above synthetic flocculant per metric ton of red mud solids and was allowed to settle in two vessels of approximately 4.3 meters diameter at just below the digestion temperature of 135° C.

It was surprisingly found that only a very small residence time was required for the separator of the present invention and a much smaller settling area was required.

Thus, for the process of this invention the settling requirement was only about 0.07 square meters per ton per day red mud solids while the prior system required 3.77 square meters per ton per day red mud solids. This remarkable improvement was achieved without any loss of clarity in the liquor obtained.

We claim:

1. In a Bayer process for producing alumina from bauxite which comprises (a) pressure digesting bauxite slurry in caustic soda solution to dissolve aluminum hydroxides in the bauxite as sodium aluminate while leaving most of the remaining constituents of the bauxite in solid form as red mud, (b) separating the red mud from the digested slurry to obtain a caustic-aluminate pregnant liquor, (c) precipitating alumina hydrate from the pregnant liquor and (d) calcining the alumina hydrate to obtain the alumina, the improvement which comprises carrying out the separation, (b), of the red mud from the digested slurry at a temperature above the atmospheric boiling temperature of the liquor phase of the slurry and a pressure above atmospheric pressure and the separation being selected from (1) settling in the presence of a synthetic flocculant, (2) filtering and (3) centrifuging.

2. A process according to claim 1 wherein the separation is carried out without substantial flash cooling of the slurry prior to said separation.

3. A process according to claim 1 wherein the separation of red mud is carried out at a temperature sufficiently high that the liquor phase of the slurry is either below saturation or is not significantly supersaturated with respect to soluble alumina constituents during the red mud separation.

4. A process according to claim 3 wherein the bauxite is boehmitic bauxite, gibbsitic bauxite or a mixed gibbsitic/boehmitic bauxite.

5. A process according to claim 4 wherein the separation of red mud is carried out at or only slightly below the gibbsitic bauxite digestion temperature.

6. A process according to claim 4 wherein the separation of red mud is carried out at a temperature in the range of about 120°-150° C.

7. A process according to claim 4 wherein a sweetening bauxite stream is added to the digested slurry prior to red mud separation.

8. A process according to claim 4 wherein the bauxite being digested comprises a miXed boehmitic/gibbsitic bauxite and the sweetening bauxite comprises a gibbsitic bauxite.

9. A process according to claim 4 wherein the digestion time is limited to the time required only for the extraction of aluminum hydroxide minerals from the bauxite and a seeded, controlled post-desilication is carried out after the red mud separation.

10. A process according to claim 9 wherein the desilication is carried out at the temperature of the red mud separation.

11. A process according to claim 9 wherein the desilication is carried out at a temperature below the red mud separation temperature.

12. A process according to claim 4 wherein the bauxite is a gibbsitic or mixed gibbsitic/boehmitic bauxite, with a first digestion being carried out at gibbsitic digestion temperature followed by a first red mud separation at approximately the gibbsite digestion temperature and the red mud from the first separation being subjected to a second digestion at gibbsite or boehmite digestion temperatures followed by a second red mud separation.

13. A process according to claim 12 wherein the digested slurry from the second digestion is at least partially cooled prior to the second red mud separation.

14. A process according to claim 12 wherein the digested slurry from the second digestion is separated at the second digestion temperature.

* * * * *